United States Patent
Fokoue et al.

(10) Patent No.: US 8,560,483 B2
(45) Date of Patent: *Oct. 15, 2013

(54) SCALABLE ONTOLOGY EXTRACTION

(71) Applicant: International Business Machines Corporation, Armonk, NY (US)

(72) Inventors: Achille Fokoue, White Plains, NY (US); Aditya Kalyanpur, Westwood, NJ (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,931

(22) Filed: Sep. 25, 2012

(65) Prior Publication Data

US 2013/0024406 A1 Jan. 24, 2013

Related U.S. Application Data

(63) Continuation of application No. 12/916,779, filed on Nov. 1, 2010.

(51) Int. Cl.
G06N 5/04 (2006.01)

(52) U.S. Cl.
USPC ............................................. 706/47; 706/12

(58) Field of Classification Search
USPC .................. 706/10, 12, 13, 14, 20, 47, 50, 52
See application file for complete search history.

(56) References Cited

U.S. PATENT DOCUMENTS

| | | | |
|---|---|---|---|
| 6,754,651 B2 | 6/2004 | Nanavati et al. | |
| 8,352,403 B2 | 1/2013 | Lee et al. | |
| 2006/0248093 A1* | 11/2006 | Lassila et al. ................. | 707/100 |
| 2007/0112824 A1* | 5/2007 | Lock et al. .................... | 707/102 |

(Continued)

FOREIGN PATENT DOCUMENTS

| JP | 4142628 A | 5/1992 |
|---|---|---|
| JP | 04142628 A2 | 5/2004 |

OTHER PUBLICATIONS

Agrawal et al., Mining Association Rules Between Sets of Items in Large Databases, SIGMOD Conference 1993: 207-216.
Fokoue et al., Sher, http://domino.research.ibm.com/comm/research_projects.nsf/pages/iaa.index.html downloaded Jul. 27, 2010.
Hipp et al., Algorithms for Association Rule Mining, A General Survey and Comparison, SIGKDD Explorations, 2 (2):1-58, 2000.

(Continued)

*Primary Examiner* — Kakali Chaki
*Assistant Examiner* — Michael Zidanic
(74) *Attorney, Agent, or Firm* — Ryan, Mason & Lewis, LLP

(57) ABSTRACT

Techniques for facilitating learning of one or more ontological rules of a resource description framework database are provided. The techniques include obtaining ontology vocabulary from a resource description framework database, generating a rule hypothesis by incrementally building upon a previously learnt rule from the database by adding one or more predicates to the previously learnt rule, performing a constraint check on the generated rule hypothesis by determining compatibility with each previously learnt rule to ensure that a complete rule set including each previously learnt rule and the generated rule hypothesis is consistent, validating the rule hypothesis as a rule using one or more association rule mining techniques to determine validity of the rule hypothesis against the database, and applying the rule to the database to infer one or more facts from the database to facilitate learning of one or more additional ontological rules.

15 Claims, 3 Drawing Sheets

(56) References Cited

U.S. PATENT DOCUMENTS

| | | | |
|---|---|---|---|
| 2008/0168017 A1* | 7/2008 | Sreedhar et al. | 706/47 |
| 2008/0301081 A1* | 12/2008 | Karnik et al. | 706/48 |
| 2009/0012842 A1* | 1/2009 | Srinivasan et al. | 705/10 |
| 2009/0249294 A1* | 10/2009 | Ocke et al. | 717/117 |
| 2009/0276764 A1* | 11/2009 | Ghorbani et al. | 717/148 |
| 2010/0036788 A1* | 2/2010 | Wu et al. | 706/47 |
| 2011/0119310 A1* | 5/2011 | Kolovski et al. | 707/794 |
| 2011/0295823 A1* | 12/2011 | Sathish | 707/705 |

OTHER PUBLICATIONS

Xu et al., Mining for Useful Association Rules Using the ATMS, IAWTIC Nov. 2005.

Association rule learning, http://en.wikipedia.org/wiki/Association_rule_learning downloaded Nov. 11, 2010.

* cited by examiner

SCALABLE ONTOLOGY EXTRACTION

CROSS-REFERENCE TO RELATED APPLICATIONS

This application is a continuation of U.S. patent application Ser. No. 12/916,779, filed Nov. 1, 2010, incorporated by reference herein.

FIELD OF THE INVENTION

Embodiments of the invention generally relate to information technology, and, more particularly, to ontological rules.

BACKGROUND OF THE INVENTION

Large resource description framework (RDF) knowledge bases containing billions of assertions have been published. The RDF stores also contain large web ontology language (OWL) schemas and/or ontologies with a multitude of concepts and relations that help interpret instance data. However, the OWL ontologies can typically be limited to a sub-class and sub-property hierarchy, and thus do not provide much inferred information by way of reasoning.

Existing association rule mining (ARM) approaches learn rules from large relational data, but such approaches have never been applied to the RDF/OWL case. As such, while relational schemas typically contain tens or hundreds of attributes and/or columns, RDF/OWL schema size is several orders of magnitudes larger, and thus existing ARM approaches cannot scale. Furthermore, many existing ARM approaches operate on simple data structures (wherein, for example, attribute values are lexical values), and are therefore not well suited for the richer structure of RDF/OWL data, where attribute values can themselves be complex objects, which results in large and complex graphs.

SUMMARY OF THE INVENTION

Principles and embodiments of the invention provide techniques for scalable ontology extraction. An exemplary method (which may be computer-implemented) for facilitating learning of one or more ontological rules of a resource description framework database, according to one aspect of the invention, can include steps of obtaining ontology vocabulary from a resource description framework database, generating a rule hypothesis, wherein generating a rule hypothesis comprises incrementally building upon a previously learnt rule from the resource description framework database by adding one or more predicates to the previously learnt rule, performing a constraint check on the generated rule hypothesis, wherein performing a constraint check on the generated rule hypothesis comprises determining compatibility with each previously learnt rule to ensure that a complete rule set including each previously learnt rule and the generated rule hypothesis is consistent, validating the rule hypothesis as a rule using one or more association rule mining techniques to determine validity of the rule hypothesis against the resource description framework database, and applying the rule to the resource description framework database to infer one or more facts from the resource description framework database to facilitate learning of one or more additional ontological rules.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
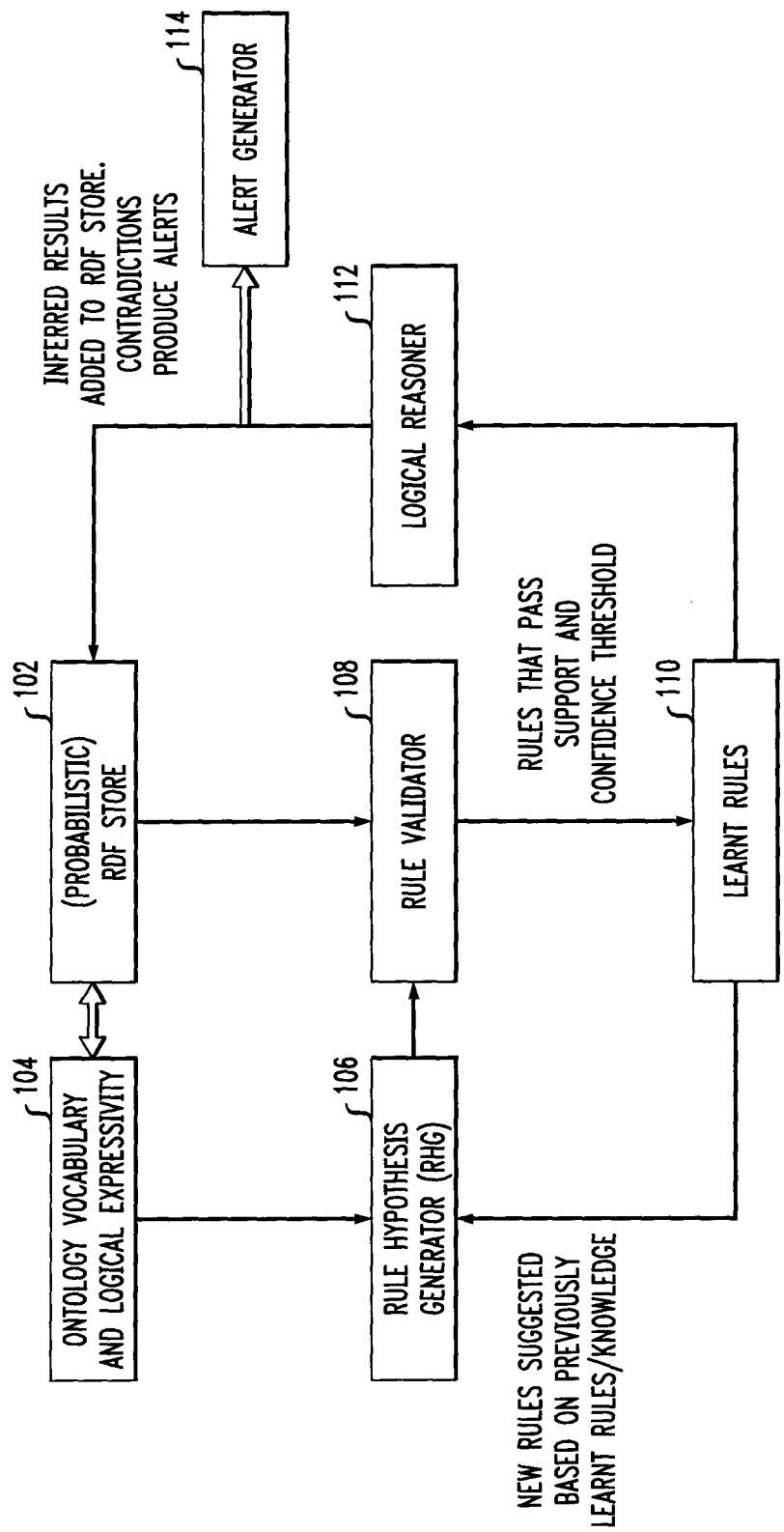
FIG. 1 is a block diagram illustrating an exemplary embodiment, according to an aspect of the invention.

Principles of the invention include scalable ontology extraction from resource description framework (RDF)/web ontology language (OWL) knowledge bases. One or more embodiments of the invention include pruning a search space of ontology rules using previously learnt constraints and re-applying inference rules to the data to learn new facts that can then facilitate learning more rules. Additionally, one or more embodiments of the invention can include facilitating the learning of complex ontological rules and/or axioms from large instance data in RDF by applying data mining practices such as, for example, association rule mining (ARM).

By way of example and not limitation, rules to be learned from large volumes of instance data can include rules such as that a domain of the headQuartered relation is an Organization, partOf is a transitive relation, parentOf is the inverse of childOf, bornIn(Person, City) and locatedIn(City, Country)→nationality(Person, Country), etc. Each such rule would be associated, for example, with a corresponding probability and/or confidence score.

One or more embodiments of the invention can be implemented, for example, in connection with a richer structure of RDF/OWL data, where attribute values can themselves be complex objects, which results in large and complex graphs. Accordingly, one or more embodiments of the invention include techniques to rule learning where previously learnt rules facilitate constraining the space for subsequent and more complex rules. As detailed herein, ARM techniques can be applied to large RDF instance stores to learn ontological rules. In order to contend with the schema size and complexity, one or more embodiments of the invention include first learning simple rules (for example, rules involving two relations) and using the results to constrain the space for more complex rules (for example, rules involving three or more relations).

As used herein, simple OWL rules can include those which have a single relation in the body and head (for example, subclass, sub-property, domain, range, symmetry, transitive, functional, inverse, etc.). Traditional ARM techniques can be used to learn these rules even from very large instance data using random sampling. However, as the number of relations in a rule increases, the number of potential rules to explore increases exponentially due to a combinatorial explosion. By way of example, with 1000 relations in a schema, there can be 970 thousand three-relation rules to explore.

In other scenarios, the schema may contain hundreds of thousands of unary relations (OWL classes) and thousands of binary relations (OWL properties). As such, one or more embodiments of the invention can include using the results of simple rules to constrain the rule-space for larger rules. For example, having obtained a domain and/or range of all binary relations in a knowledge base, one or more embodiments of the invention can include constructing three relation rules where all of the end-points of the relations have compatible types (domain/range). This can exclude a large number of rules that are not meaningful or consistent. Similar principles can be applied to learning more complex and larger rules.

Additionally, in one or more embodiments of the invention, the rules in question are not restricted to any context (and are thus global). Also, as described herein and in contrast to disadvantageous existing approaches, one or more embodiments of the invention includes learning association rules involving concepts, properties, individuals, etc. in ontological data (such as expressed, for example, in RDF/OWL). The learnt association rules can be treated as logical inference rules. Those rules are applied to the data to generate new facts, and this information is used to infer new rules, resulting in a continuous feedback loop.

FIG. 1 is a block diagram illustrating an exemplary embodiment, according to an aspect of the invention. By way of illustration, FIG. 1 depicts a probabilistic RDF store module 102, an ontology vocabulary and logical expressivity module 104, a rule hypothesis generator (RHG) module 106, a rule validator module 108, a rules learnt module 110, a logical reasoner module 112, and an alert generator module 114.

The probabilistic RDF store module 102 includes a database which uses the RDF syntax for specifying assertions and facts about instances (for example, in this context, instances are named entities such as specific people, objects, places, events, etc.). Also, in one or more embodiments of the invention, each of the facts is optionally associated with a probability score. The ontology vocabulary and logical expressivity module 104 includes vocabulary that includes the complete set of classes, properties and individuals that are referred to in the RDF store. This is analogous to a database schema for the RDF store. The expressivity specifies the logical operators, which can be used to state axioms about terms in the vocabulary. For example, some expressive logics, such as the OWL, allow Boolean operators such as AND, OR, NOT to be applied to concepts and properties in the vocabulary.

The rule hypothesis generator (RHG) module 106 generates a new rule hypothesis for the rule validator module 108 to test and verify against the RDF store. The RHG module makes use of the previously learnt rules when suggesting the new hypothesis. In one or more embodiments of the invention, each new rule is incrementally built from an existing rule by adding a predicate to either the body or the head of the rule.

As used herein, predicates are defined in their standard first order logic (FOL) sense and are relations involving a fixed set of arguments. The predicates can be selected from the ontology vocabulary and are combined using operators allowed within the expressivity of the logic. Also, constraint checking is performed to ensure that the new hypothesis is both valid and feasible. This includes checking that the complete rule set including previously learnt rules and the newly suggested rule hypothesis is not inconsistent (or contradictory). This step aids in ensuring the scalability of the ontology extraction process as it helps eliminate a number of invalid rule hypotheses.

Because the learnt rule base is initially empty, the first set of hypothesis generated include rules with only one predicate in both the body and the head (for example, subclass rules $(C(x){\rightarrow}D(x))$ and sub-property rules $(R1(x, y){\rightarrow}R2(x, y))$). By way of example, suppose a previously learnt rule L1 is $R1(x, y){\rightarrow}R2(x, y)$, where R1, R2 are binary predicates in the ontology vocabulary, and x, y are variables. The hypothesis RHG module could suggest a new rule L2: $R1(x, y)\char`\^R3(y, z){\rightarrow}R2(x, y)$; however, such a rule would be discarded, as L2 is entailed by L1. Similarly, another rule that could be suggested is L3: $R1(x, y)\char`\^R3(y, z){\rightarrow}R2(x, z)$. In this instance, the constraint checker would verify that the range of R1 and the domain of R3 are compatible, that is, the two types are not disjoint (or the intersection of instances of R1 and R3 is above a certain threshold), because this condition is necessary for the chain R1-R3 to be feasible. Note that the domain and/or range of the relations can be computed in a previous step.

As detailed herein, one or more embodiments of the invention include incrementally building upon previous rules and performing constraint checking to throw out invalid hypothesis to ensure scalability of the technique, given the exponential size of the search space. Also, in one or more embodiments of the invention, the process terminates based on a user-specified limit on rule length (that is, the maximum number of predicates present in a rule).

The rule validator module 108 can apply traditional ARM algorithms, or other similar techniques, to validate a hypothesis rule against an RDF instance store. Additionally, the rule validator module uses parameters such as, for example, rule support and rule confidence to judge the validity of a rule. The learnt rules module 110 stores the rules that are induced from the RDF data by the ARM module and that pass the requisite support and/or confidence filter threshold. In one or more embodiments of the invention, the learnt rules are used in two ways: (i) to generate new rules to test in the RHG module; and (ii) being applied to the RDF data using a logical reasoner to infer new facts. The probability score for the facts depends on the confidence of the learnt rules, that is, the higher the confidence of the learnt rule, the greater the probability score assigned to the inferred fact.

The logical reasoner module 112 includes using a large scale ontology reasoner to infer new facts from the RDF data by applying the logical learnt rules. Inferred results can be added to the RDF store. Additionally, when the learnt rules are applied to the RDF data using a logical reasoner, it is possible that contradictions are found in the data. Accordingly, alerts can be generated by the alert generator module 114 in such cases to make the user aware of such conflicts.

Figure 2:
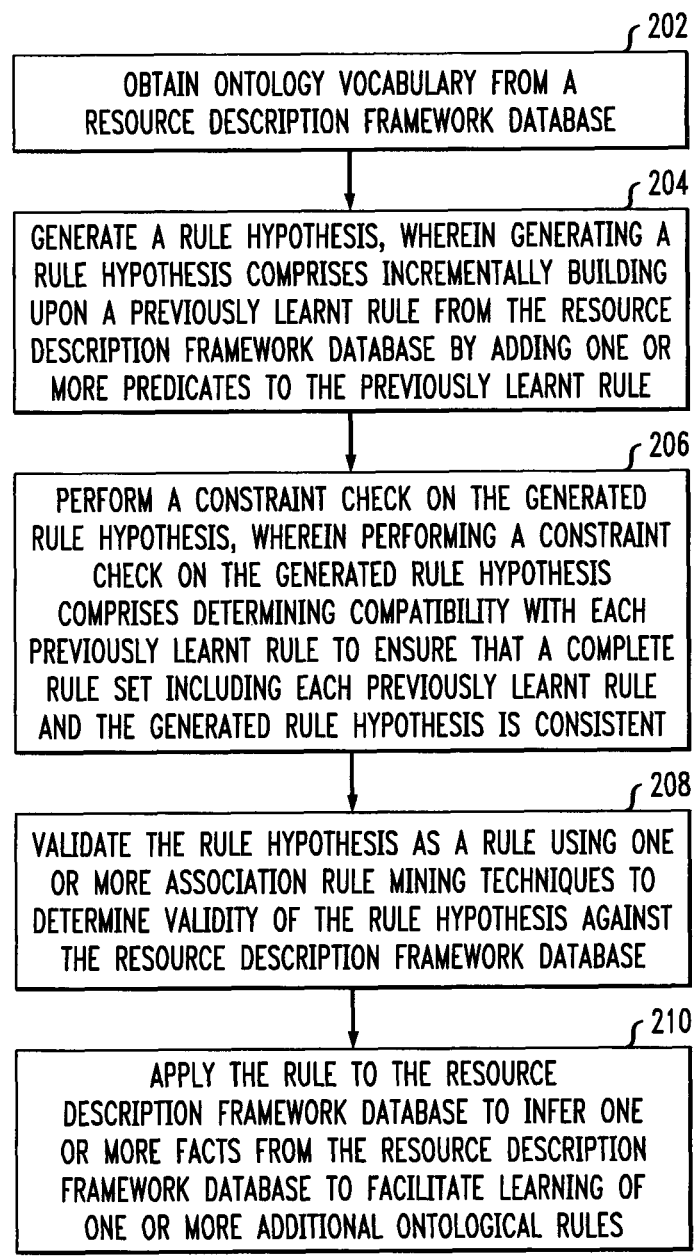
FIG. 2 is a flow diagram illustrating techniques for facilitating learning of one or more ontological rules of a resource description framework database, according to an embodiment of the invention.

FIG. 2 is a flow diagram illustrating techniques for facilitating learning of one or more ontological rules of a (for example, very large-scale) resource description framework database, according to an embodiment of the present invention. Step 202 includes obtaining ontology vocabulary from a resource description framework database. This step can be carried out, for example, using a probabilistic RDF store module. The resource description framework database uses resource description framework syntax for specifying assertions and facts about instances (for example, specific mentions of named entities such as specific people, places, objects, events, etc.). Also, each fact can be associated with a probability score.

Step 204 includes generating a rule hypothesis, wherein generating a rule hypothesis comprises incrementally building upon a previously learnt rule from the resource description framework database by adding one or more predicates to the previously learnt rule. This step can be carried out, for example, using a rule hypothesis generator module. Adding predicates to the previously learnt rule can include adding predicates to the body or head of the previously learnt rule. Additionally, the predicates can be selected from the ontology vocabulary and combined using one or more operators allowed within a logic expressivity of the resource description framework database.

Step 206 includes performing a constraint check on the generated rule hypothesis, wherein performing a constraint check on the generated rule hypothesis comprises determining compatibility with each previously learnt rule to ensure that a complete rule set including each previously learnt rule and the generated rule hypothesis is consistent (that is, not contradictory). This step can be carried out, for example, using a rule hypothesis generator module.

Step 208 includes validating the rule hypothesis as a rule using one or more association rule mining techniques to determine validity of the rule hypothesis against the resource description framework database. This step can be carried out, for example, using a rule validator module. Validating the rule hypothesis using association rule mining techniques to determine validity of the rule hypothesis against the resource description framework database can include using association rule mining techniques with one or more parameters such as, for example, rule support, rule confidence, etc.

Step 210 includes applying the rule to the resource description framework database to infer one or more facts from the resource description framework database to facilitate learning of one or more additional ontological rules. This step can be carried out, for example, using a logical reasoner module. Applying the rule to the resource description framework database to infer facts from the resource description framework database can include applying the rule to the resource description framework database using a rule-based logical reasoning module. Additionally, facilitating learning of additional ontological rules can include using facts learnt via applying the rule to the resource description framework database as a basis for constraint checking validity of future rule hypotheses.

The techniques depicted in FIG. 2 can additionally include storing (via the rule validator module) a rule induced from the resource description framework database that passes a threshold of at least one of support and confidence. Further, the techniques depicted in FIG. 2 can also include utilizing a feedback loop to improve coverage, wherein utilizing a feedback loop includes applying previously learnt rules to the resource description framework database to infer new facts which are used as a basis for discovering one or more additional ontological rules. Additionally, one or more embodiments of the invention include generating an alert if an assertion involving one or more instances invalidates a rule or a set of rules in the resource description framework database. Further, the techniques depicted in FIG. 2 can include adding inferred facts to the resource description framework database.

The techniques depicted in FIG. 2 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a probabilistic RDF store module, an ontology vocabulary and logical expressivity module, a rule hypothesis generator (RHG) module, a rule validator module, a rules learnt module, a logical reasoner module, and an alert generator module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
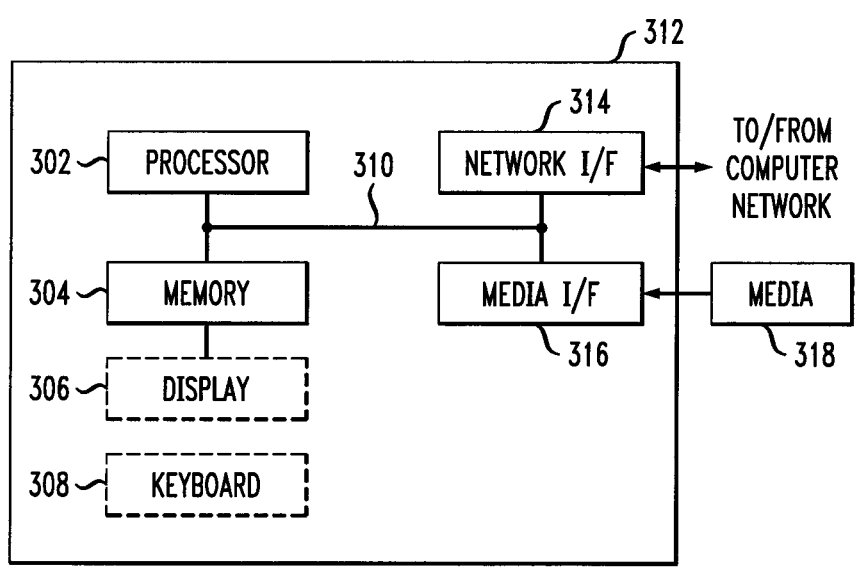
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, an electronic, magnetic, optical, electromagnetic, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, using previously learned rules for constraining the search space for learning more complex rules.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for facilitating learning of one or more ontological rules of a resource description framework database, wherein the method comprises:
    obtaining ontology vocabulary from a resource description framework database;
    generating a rule hypothesis, wherein generating a rule hypothesis comprises incrementally building upon a previously learnt rule from the resource description framework database by adding one or more predicates selected from the ontology vocabulary to the previously learnt rule;
    performing a constraint check on the generated rule hypothesis, wherein performing a constraint check on the generated rule hypothesis comprises determining compatibility with each previously learnt rule to ensure that a complete rule set including each previously learnt rule and the generated rule hypothesis is consistent;
    validating the rule hypothesis as a validated rule using one or more association rule mining techniques with a rule confidence parameter to determine validity of the rule hypothesis against the resource description framework database; and
    applying the validated rule to the resource description framework database to constrain space in the resource description framework database for one or more additional ontological rules and to infer one or more facts from the resource description framework database;
    learning one or more additional ontological rules based on the one or more facts inferred from the resource description framework database, wherein the one or more additional ontological rules comprise one or more additional predicates than the validated rule.

2. The method of claim 1, wherein applying the rule to the resource description framework database to infer one or more facts from the resource description framework database comprises applying the validated rule to the resource description framework database using a rule-based logical reasoning module.

3. The method of claim 1, further comprising using one or more facts learnt via applying the validated rule to the resource description framework database as a basis for validating one or more future rule hypotheses.

4. The method of claim 1, wherein validating the rule hypothesis as a validated rule using one or more association rule mining techniques with a rule confidence parameter to determine validity of the rule hypothesis against the resource description framework database comprises using one or more association rule mining techniques with a rule confidence parameter and a rule support parameter.

5. The method of claim 1, further comprising storing a rule induced from the resource description framework database that passes a threshold of at least one of support and confidence.

6. The method of claim 1, further comprising utilizing a feedback loop to improve coverage, wherein utilizing a feedback loop comprises applying one or more previously learnt rules to the resource description framework database to infer one or more new facts which are used as a basis for discovering one or more additional ontological rules.

7. The method of claim 1, further comprising generating an alert if an assertion involving one or more instances invalidates one or more rules in the resource description framework database.

8. The method of claim 1, wherein the resource description framework database uses resource description framework syntax for specifying one or more assertions and one or more facts about one or more instances.

9. The method of claim 8, wherein each of the one or more facts is associated with a probability score.

10. The method of claim 1, wherein adding one or more predicates selected from the ontology vocabulary to the previously learnt rule comprises adding one or more predicates to a body of the previously learnt rule.

11. The method of claim 1, wherein adding one or more predicates selected from the ontology vocabulary to the previously learnt rule comprises adding one or more predicates to a head of the previously learnt rule.

12. The method of claim 1, wherein the one or more predicates are selected from the ontology vocabulary and combined using one or more operators allowed within a logic expressivity of the resource description framework database.

13. The method of claim 1, wherein validating the rule hypothesis against one or more instances from the resource description framework database comprises using association rule mining techniques.

14. The method of claim 1, wherein performing a constraint check on the generated rule hypothesis comprises using one or more parameters to judge validity of the rule hypothesis.

15. The method of claim 1, further comprising adding one or more inferred facts to the resource description framework database.

* * * * *